United States Patent [19]
Morton

[11] Patent Number: 5,492,578
[45] Date of Patent: Feb. 20, 1996

[54] ALIGNMENT APPARATUS AND ASSOCIATED METHODS FOR DEPTH IMAGES

[75] Inventor: Roger A. Morton, Penfield, N.Y.

[73] Assignee: Eastman Kodak Company, Rochester, N.Y.

[21] Appl. No.: 297,182

[22] Filed: Aug. 26, 1994

Related U.S. Application Data

[63] Continuation of Ser. No. 45,447, Apr. 8, 1993, Pat. No. 5,391,254.

[51] Int. Cl.⁶ ..................................................... B32B 31/00
[52] U.S. Cl. ........................... 156/64; 156/212; 156/222; 156/223; 156/229; 355/123
[58] Field of Search ............................. 156/64, 212, 221, 156/222, 223, 229; 355/122, 123

[56] References Cited

U.S. PATENT DOCUMENTS

| | | | |
|---|---|---|---|
| 3,146,492 | 9/1964 | Lemelson | 18/10 |
| 3,250,173 | 5/1966 | Henry | 88/1 |
| 3,264,164 | 8/1966 | Jerothe et al. | 161/33 |
| 3,365,350 | 1/1968 | Cahn | 161/33 |
| 3,385,721 | 5/1968 | Leach | 117/10 |
| 3,462,226 | 8/1969 | Huffaker | 356/72 |
| 3,582,329 | 6/1971 | Ivanov et al. | 96/35 |
| 3,595,943 | 7/1971 | Brunson et al. | 260/897 B |
| 3,895,867 | 7/1975 | Lo et al. | 355/77 |
| 4,414,316 | 11/1983 | Conley | 430/496 |
| 4,420,527 | 12/1983 | Conley | 428/172 |
| 4,478,639 | 10/1984 | Smith et al. | 430/9 |
| 4,494,864 | 1/1985 | Smith et al. | 355/22 |
| 4,557,954 | 12/1985 | Gundlach et al. | 428/29 |
| 4,588,899 | 5/1986 | Erhardt | 250/491.1 |
| 4,869,946 | 9/1989 | Clay | 428/167 |
| 5,034,982 | 7/1991 | Heninger et al. | 380/54 |

FOREIGN PATENT DOCUMENTS

| 1659964 | 6/1991 | U.S.S.R. | |
| 1133224 | 11/1968 | United Kingdom | C08F 29/02 |

Primary Examiner—David A. Simmons
Assistant Examiner—Paul M. Rivard
Attorney, Agent, or Firm—Edward Dugas

[57] ABSTRACT

The present invention is directed to an apparatus and an associated method for achieving alignment between an image on a film and a lenticular material that is to be bonded to the film to permit the image to be viewed in 3D. The apparatus imparts a controlled bending of the lenticular material over the film such that the slight differences in length between the lenticular material and the film, caused by the bending, adjusts for changes in the line spacing of the lenticular material and or in the spacing of the image segments. Other embodiments of the invention provide for a controlled stretching of the film along its length and from side-to-side to again compensate for variations in the line spacing of the lenticular material or spacing of the image segments.

5 Claims, 2 Drawing Sheets

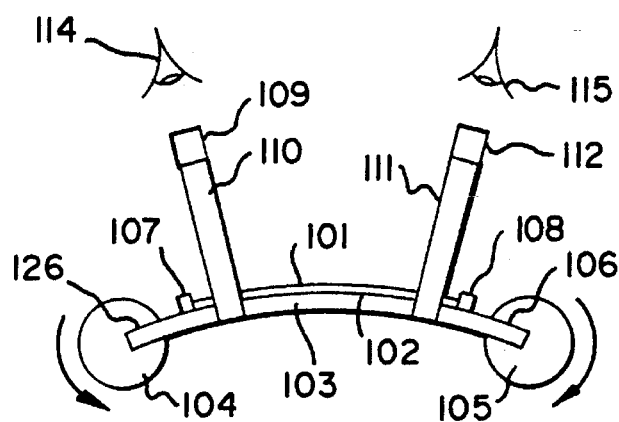
FIG. 1
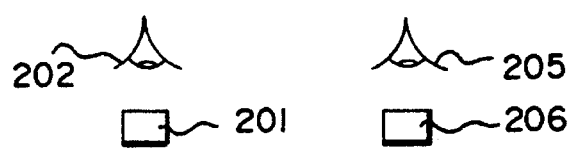
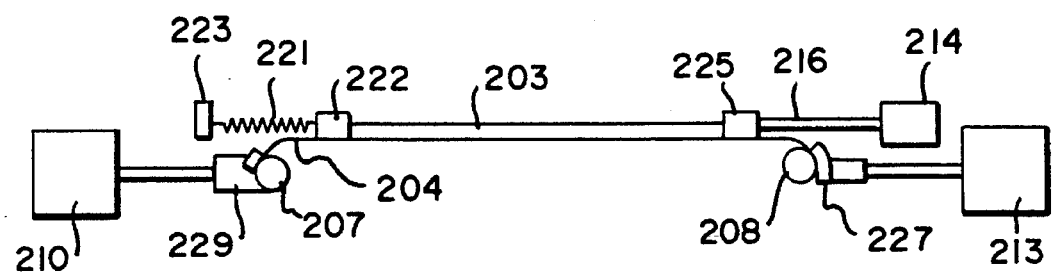
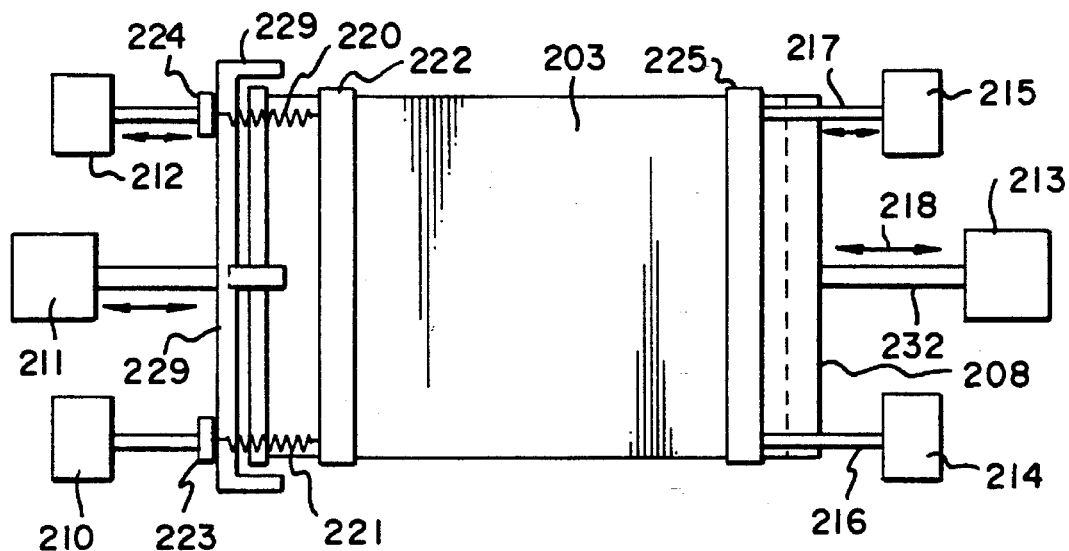
FIG. 2A
FIG. 2B

ALIGNMENT APPARATUS AND ASSOCIATED METHODS FOR DEPTH IMAGES

This is a Continuation of U.S. patent application Ser. No. 045,447, filed 08 Apr. 1993, now U.S. Pat. No. 5,391,254.

FIELD OF THE INVENTION

The field of this invention relates to the alignment of preprinted film to lenticular material.

BACKGROUND OF THE INVENTION

Kodak is one of the first companies to produce and introduce 3D imagery where the image is bonded to a lenticular material after the image is printed. U.S. patent application Ser. No. 885,411 entitled "A Method of Adapting Scan Print Images with Lenticular Face Plates" by Roy Taylor addresses this architecture. A key element of laminating lenticular material to a developed image on film is the obtaining of an accurate alignment between the film image and the lenticular material. This element has been covered in U.S. patent application Ser. No. 885,699, now U.S. Pat. No. 5,278,608, entitled "Electronically Printed Integral Photography System" by Roy Taylor and Sergei Fogel.

Our experience with laminating film to lenticular material indicates however that there can be variations in the spacing of lens elements from one piece of lenticular material to another or in the spacing of image elements from one piece of film to another. Variations in lenticular material can arise from variations in shrinkage (lenticular material has a typical shrinkage after molding of 0.1% to 1% of the material size). While the average value of this shrinkage can be predicted and compensated for, variations in the shrinkage from piece to piece of the lenticular material or variations in the shrinkage of the film which is matched against the lenticular material may cause a significant loss of image quality.

The scale of allowable variations may be quite small. For example, an image which is 10" wide and has 70 lenticules per inch with 15 views per lenticule, has 10,500 views across its width. For the highest image quality the maximum allowable misregistration is plus or minus half a view allowing a differential shrinkage between the lenticular material and the film must be kept to plus or minus 0.005%.

(As already indicated, lenticular materials typically shrink in the range of 0.1% to 1%. Based on the considerations already referred, maximum allowable shrinkage variation must be 1/20th to 1/200th of these vales. In fact, the actual allowable variation for the lenticular material would even be less than this since the total variation must be shared with the film which has a variance of its own.)

Considering variations in material, variations in molding practices and other sources of variation, maintaining variation of the order of 0.005% in shrinkage cannot always be guaranteed. Therefore for the highest quality images some method of matching the pitch (spacing) and in some cases even the curvature (see FIG. 4) of the lenticular material to the film becomes necessary.

The present invention is directed to alignment apparatus and associated methods by which this may be done to differentially match the size or scale of the lenticular material to exposed film on a piece by piece basis.

SUMMARY OF THE INVENTION

This invention relates to correction techniques for alignment of preprinted film to lenticular material to compensate for second order affects such as shrinkage and curvature. These corrections are applied by causing differential stretch between the film and the lenticular material in order to achieve a matching pitch prior to or during the alignment of the film to the material. It is an object of the present invention to align film to lenticular material to provide a quality which is beyond the achievable differential shrinkage of the material.

The basic invention involves placing registration images on left and right edges of the film and optionally across the top and bottom and stretching or curving the lenticular film combination prior to final lamination so that alignment between the lenticules and the registration areas is achieved both at left and right edges and optionally around the periphery.

The preferred apparatus embodiment is as apparatus for aligning images of a film member to a lenticular member comprising:
  means for changing the scale of one member relative to the other; and
  means for observing the degree of alignment of the film member and the lenticular member as the scale is changed to identify the achievement of a desired degree of alignment.

The preferred method of the invention for aligning images of a film member to a lenticular member comprises the steps of:
  a) placing the lenticular member in surface contact with the film member;
  b) observing the alignment of the members;
  c) changing the scale of one member relative to the other member if the alignment is not acceptable; and
  d) observing the degree of alignment of the film member and the lenticular member as the scale is changed to identify the achievement of a desired degree of alignment.

The above and other objects of the present invention will become more apparent when taken in conjunction with the following description and drawings wherein like characters indicate like parts and which drawings form a part of the present invention.

BRIEF DESCRIPTIONS OF THE DRAWINGS

FIG. 1 illustrates an alignment system wherein the lenticular material and film prior to bonding are placed on a flexing plate and the plate is caused to flex so as to compensate for differential shrinkage.

FIGS. 2A and 2B illustrate in more detail a side view and a plan view, respectively, of the system of FIG. 1 designed to stretch film and confer curvature to compensate for both lens curvature and differential shrinkage between the lenticular material and the film when using a bonding method such as UV bonding.

DETAILED DESCRIPTION OF THE INVENTION

Figure 3:
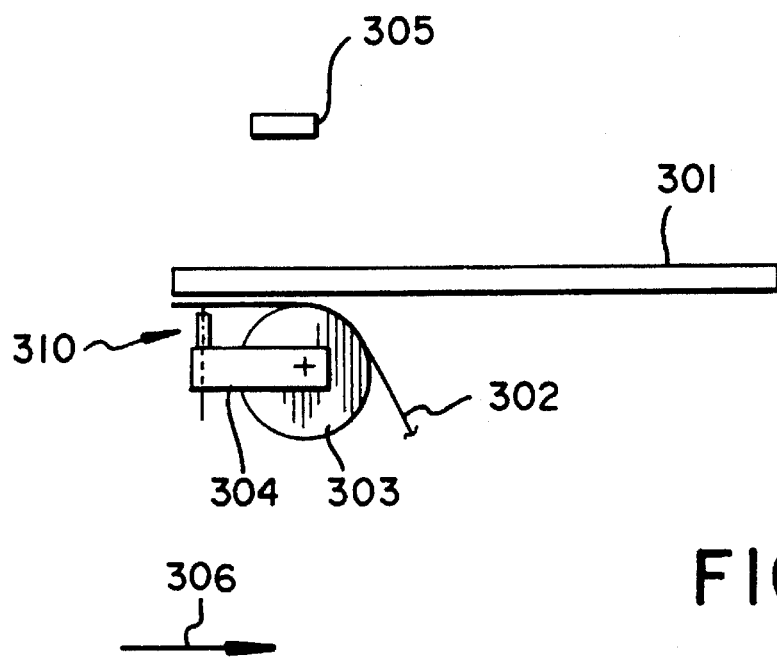
FIG. 3 illustrates a method which compensates for differential shrinkage and warpage between film and lenticular material when a contact glue is used such as double sided tape or where a time setting glue is used.

This invention takes different forms depending on two factors. The first factor is the way the lenticular material is bonded to the film. The second depends on the degree of differential compensation which is desired.

In the detailed description we will disclose a number of methods for compensating for differential shrinkage or expansion (scale changing) between the lenticular material and the film as they are bonded together.

FIG. 1 illustrates an arrangement of a lenticular material 101 mounted on top of a sheet of film 102 with both the lenticular material 101 and the film 102 lying on a flexing plate 103. This plate is enabled to flex up or down by shafts, 104 and 105, which are turned to cause the flex to occur. Plate 103 engages in slots 126 and 106 formed in shafts 104 and 105, respectively. The lenticular material 101 is secured on the flexing plate 103 by clamps 107 and 108. An imaging optic 109 is mounted on a support 110 which ensures that the optic is normal to the plate 103 at the left end of the lenticular material. Similarly at the right end support 111 supports an imaging optic 112. The lenticular material and the film are initially positioned with the plate flat and the alignment is ensured by viewing with eye 114 through the imaging optic 109 to view the alignment at the left end between the lenticular material and the film. Once alignment is established a UV adhesive material is activated so that the film is secured at that point against the lenticular material and then at the right end position alignment is again observed through the imaging optic 112. Because of the slight shrinkage or expansion between the film and the lenticular material it will be necessary to slightly flex the plate 103 up or down so that at the right end alignment can also be achieved. Once the plate is bent through applying torque to the shafts 104 and 105 to the degree necessary in order to get alignment at the right hand end as viewed at the eye position 115 the lenticular material is LTV bonded to the film at that point. Thus, the flexing of the plate with the lenticular material on it causes the film 102 to move a very small amount with respect to the position of the lenticular material thereby giving the differential motion necessary to bring alignment at the right end.

An alternate embodiment is shown in FIGS. 2A and 2B. In this embodiment, viewing eye 202 uses an image optic 201 to ensure that there is alignment at the left end between a lenticular material 203 and a film sheet 204 which is positioned below the lenticular material and extends on either side of it. Similarly alignment is ensured at the right end with image optic 206 viewed at eye position 205.

The film 204 is secured at the left end with an eccentric clamp 207 and at the right end with an eccentric clamp 208. The film is anchored at the right end, but at the left end actuator motors 210, 211 and 212 are able to pull the film and stretch it (change its scale) in relationship to the anchored end 208. In addition, at the right end, actuator motor 213 is able to flex the clamp 208 to put a bow into the film which may be leftwards going or rightward going. This bowing provides a local scale change as all of the film does not experience the same amount of stretching or compressing. The lenticular material 203 lies on top of the film 204 and its position is controlled by actuator motors 214 and 215 using push shafts 216 and 217, respectively.

These push shafts provide small accurately controlled motions in the directions of the arrows (for example arrow 218). Consequently each of the 6 motors, 210 through 215 provide small accurately controlled motions in the directions of the arrows preferably using backlash free screw threads on the actuator shafts. The motion of the lenticular material 203 is controlled through shafts 216 and 217 and the lenticular material slides on the top of the film 204 guided at each end by pairs of edges 225 and 222. These edge pieces are simply placed between the pushers 217 and 216 in the case of edging piece 225, while edging piece 222 lies between the lenticular material and a set of springs 221 and 220. These springs rest against stops 223 and 224, respectively, and put the lenticular material, the edging pieces 225 and 222, the motor push shafts 216, and 217 in compression.

The film 204 which lies beneath the lenticular material 203 is anchored at the right hand edge by clamp 208 which bears against a backing piece 227 which in turn is fixed at the ends (not shown) but is able to flex in the center under urging of push shaft 218 connected to motor 213. Thus it is possible to put a slight bow in the film in either direction thereby compensating for curvature in the lenticles or curvature of the film image. (In this case the push shaft 232 may either apply compression or tension.) At the left end the film is also secured by eccentric clamp 207 which is fastened to a frame 229. The frame position is controlled by the actuator motors 210 and 212 at the end and flexed in the middle by actuator motor 211 through frame 229.

Thus the operator by controlling the actuator motors from a control panel (not shown) is able to stretch the film material and also apply a bend so that when viewed at eye position 202, through image optic 201, alignment is achieved at the left end. It will be appreciated that using this approach because it is only possible to stretch the film (not compress it) is necessary to make the film pitch slightly smaller than the lenticular material.

The degree to which the film pitch is smaller then the lenticular material is defined as the worse case anticipated differential shrinkage between the lenticular material and the film.

Figure 4:
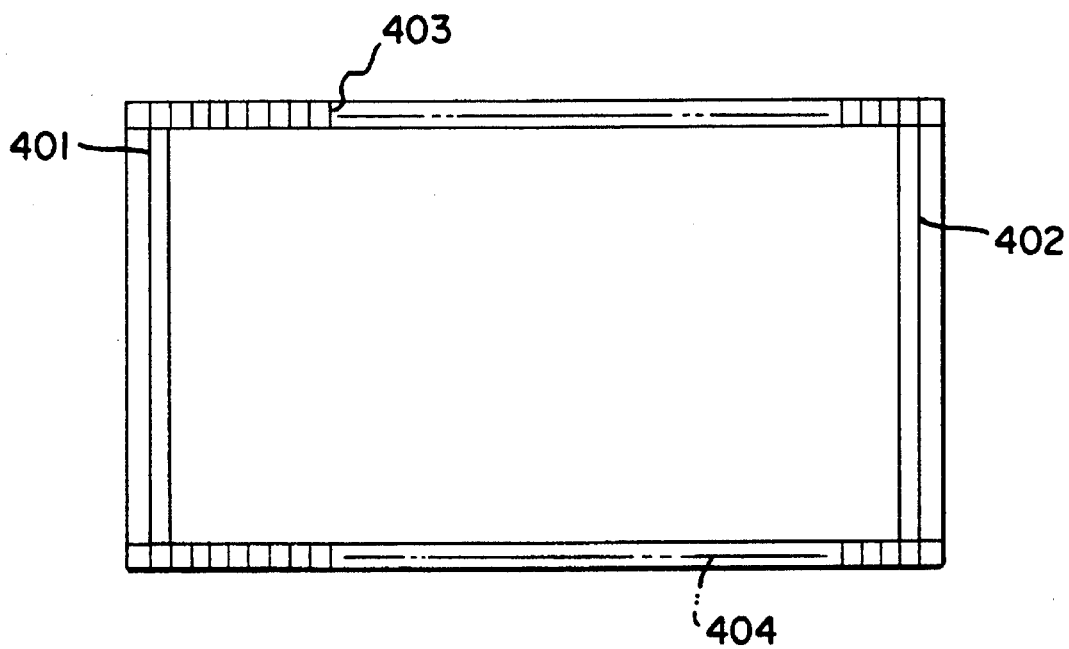
FIG. 4 illustrates a lenticular material having alignment marks on the end and side portions.

A third method for aligning the lenticular material to the film that is used when double sided adhesive or a time setting adhesive is used to glue the lenticular material to the film is shown diagrammatically in FIG. 3. This method is used when the film pitch is somewhat smaller than the lenticular material pitch by the maximum anticipated differential shrinkage between the lenticular material and the film. A frame 304 supports a roller 303 on which an adjustable brake is applied (not shown). The frame 304 is driven very slowly in the direction of arrow 306 across the bottom of the lenticular material causing the film 302 to be pressed against the bottom of lenticular material 301. Moving along with the frame 304 is the image optic 305 moving in the same direction as arrow 306 and in direct alignment with the nip point of the roller 303. As shown in FIG. 4 reference alignment images or marks are put not only on the left and right of the image in areas 401 and 402 as used in the first and second embodiments already discussed, but also alignment images are placed along the top of the image at 403 and 404. These upper and lower alignment images are key images for optically viewing the alignment during the motion of gluing the film to the lenticular material.

The technique works as follows: As the image optic 305 and frame 304 slowly advance along the lenticular material the observer checks for the alignment of marks in regions 403 and 404 of the lenticular material to the film. Should the film require more tension in order to maintain alignment the user applies the brake (not shown) on drum 303 and should there be a differential misalignment between the top and bottom a steering adjustment (not shown) on frame 304 allows slight angular adjustment around an axis of a shaft 310 to put more or less tension on the top or bottom portions of the film. The operator continues to view the alignment at the top and bottom edges of the film to the lenticular material as the roll advances across the lenticular material thereby ensuring alignment across the entire image.

It will be appreciated that in the system shown in FIG. 3, if the glue used is one where setting occurs over a period of time, it is necessary to clamp at the left end, the film to the lenticular material in order to apply the necessary tension in laying the film down on the surface.

While there has been shown what are considered to be the preferred embodiments of the invention, it will manifest that many changes and modifications may be made therein without departing from the essential spirit of the invention. It is intended, therefore, in the annexed claims, to cover all such changes and modifications as may fall within the true scope of the invention.

Parts List
101 Lenticular material
102 Film
103 Flex plate
104 Shaft
105 Shaft
106 Slots
107 Clamps
108 Clamps
109 Imaging Optic
110 Support
111 Support
112 Imaging Optic
114 Eye position
115 Eye position
126 Slots
201 Optic
202 Eye position
203 Lenticular material
204 Film
205 Eye Position
206 Imaging Optic
207 Eccentric clamp
208 Eccentric clamp
210 Actuator Motor
211 Actuator Motor
212 Actuator Motor
213 Actuator Motor
214 Actuator Motor
215 Actuator Motor
216 Push shaft
217 Push shaft
218 Push shaft
220 Spring
221 Spring
222 Edge
223 Stops
224 Stops
225 Edge
227 Backing piece
229 Frame
232 Push shaft
301 Lenticular material
302 Film
304 Roller/drum
304 Frame
305 Imaging optic
306 Direction arrow
310 Shaft
401 Alignment images
402 Alignment images
403 Alignment images
404 Alignment images

I claim:

1. Method for aligning images of a film member to a lenticular member comprising the steps of:
   a) placing the lenticular member in surface contact with the film member;
   b) observing the alignment of the members;
   c) changing the scale of one member relative to the other member if the alignment is not acceptable; and
   d) observing the degree of alignment of the film member and the lenticular member the scale is changed to identify the achievement of a desired degree of alignment.

2. The method for aligning images according to claim 1 and further comprising the step of bonding the lenticular member to the film member to maintain the desired degree of alignment.

3. The method for aligning images according to claim 1 wherein the scale of the members is changed by curving the members around the plane of surface contact.

4. The method for aligning images according to claim 1 wherein the scale of the members is changed by stretching at least one of the members.

5. Method for aligning images of a film member to a lenticular member comprising the steps of:
   a) placing the lenticular member in surface contact with the film member;
   b) aligning and bonding one end of the film member to the lenticular member;
   c) curving the film member and the lenticular member on a flexible plate;
   d) observing the alignment of the members;
   e) changing the curvature of the flexible plate until the observed alignment of the members is acceptable; and
   f) bonding the remainder of the film member to the lenticular member.

* * * * *

UNITED STATES PATENT AND TRADEMARK OFFICE
CERTIFICATE OF CORRECTION

PATENT NO. : 5,492,578
DATED : February 20, 1996
INVENTOR(S) : Roger A. Morton

It is certified that error appears in the above-indentified patent and that said Letters Patent is hereby corrected as shown below:

Column 6, line 6, delete "304" (first occurrence) and insert --303--.

Column 6, line 25, after "member" insert --as--.

Signed and Sealed this

Eleventh Day of June, 1996

*Attest:*

BRUCE LEHMAN

*Attesting Officer*   Commissioner of Patents and Trademarks